Feb. 13, 1923.

C. HORTON

POWER TRANSMISSION

Filed Nov. 4, 1919

Inventor
Charles Horton

Feb. 13, 1923.

C. HORTON

POWER TRANSMISSION

Filed Nov. 4, 1919

Inventor
Charles Horton

Patented Feb. 13, 1923.

1,445,216

UNITED STATES PATENT OFFICE.

CHARLES HORTON, OF RIDGEFIELD PARK, NEW JERSEY.

POWER TRANSMISSION.

Application filed November 4, 1919. Serial No. 335,719.

*To all whom it may concern:*

Be it known that I, CHARLES HORTON, a citizen of the United States, and a resident of Ridgefield Park, in the county of Bergen and State of New Jersey, have invented certain new and useful Improvements in Power Transmissions, of which the following is a specification.

This invention relates to power transmission.

It is a continuation, in part, of the invention disclosed in my copending application, Serial No. 305,060, and some of the claims of that application will cover the improvements herein disclosed.

In said copending application, it is stated that the purpose of the invention is to provide a method of, and apparatus for, transmitting power, as from a prime mover, to any member or mechanism to be driven, in such a way as to have under perfect control the speed of the part driven in relation to the speed of the prime mover without any appreciable loss of power; in other words, to obtain increased torque in combination with decreased speed at the driven mechanism, with high efficiency. According to the invention of said copending application, the above purpose is accomplished by taking the power from the prime mover and dividing this power into two equal parts, conveniently by means of some form of differential, passing on one part to the driven mechanism, and returning the other part of the power through a controlled device or devices to the prime mover to be absorbed by the latter, before the differential is again reached, so as to appear eventually also at the driven mechanism. By "prime mover," a convenient term, there was meant in that application, and there is meant here, any driving means, as a line or counter shaft, a crank shaft of a reciprocating engine, or the like.

It was explained further in said copending application, in connection with the explanation of the meaning of the word "differential" as used therein in describing conceptions and analyses fundamental to the invention there disclosed, that such differential need not necessarily be a mechanical differential of the cogged-wheel type, such as a planetary gear-set. In brief, it may be said that it was explained in said copending application that to constitute a true differential, as such term was used therein, there need only be present a machine or apparatus for doing work characterized by means admitting of an input of the power at a single point and a simultaneous delivery of the power at two other points, with one power component, as torque or speed, variable at one of the last mentioned two points, thereby to vary a component, and hence both components, of the power delivered at the other of said two points.

These conceptions and distinctions adhere here also.

According to the construction herein disclosed, to carry out the above conception, the compressed air is applied mechanically to the crank-shaft of the engine, either by way of a reciprocating or other air motor mechanically coupled to the crank-shaft of the engine, or by way of the engine cylinders themselves, with the engine cylinders in the latter case acting as power cylinders on the admission and solely as the result of a charge of compressed air, and with the times of admission of compressed air charges properly synchronized to agree with the cycle according to which the engine is operated, as the well known two or four-cycle.

It is thus seen that a "power-generating appliance" is employed in connection with the control of the fraction of the power issuing from the transmission at said rotary part. Such appliance, in the construction just described, would be the air compressor mentioned. It will be clear that this air compresser, while adapted to function to control the speed of said rotary part and consequently the speed of the workshaft (such control being obtained, for example, by an adjustable valve or the like to control the back pressure on the compresser) is a power-generating appliance, not in the sense of course that it creates more power than is delivered to it in operating it from said rotary part, but in the sense that while being driven by said rotary part to serve a highly useful purpose, it is functioning as a power-developing appliance; or, perhaps better, as a power-delivering appliance. Therefore, these three expressions, "power-generating appliance," "power-developing appliance," and "power-delivering appliance" are herein employed synonymously.

The invention will be more clearly understood from the following description, when taken in connection with the accompanying drawings illustrating preferred embodiments.

In these drawings.

Referring to Figs. 1 to 7, inclusive, the construction shows practically a unitary structure having included therein an internal combustion engine, a differential gear-set installed in a fly-wheel, a three-cylinder air pump located between the engine cylinders and the fly-wheel, a compressed air tank above the air pump, and an air motor incorporated in the internal combustion engine.

Figure 1:
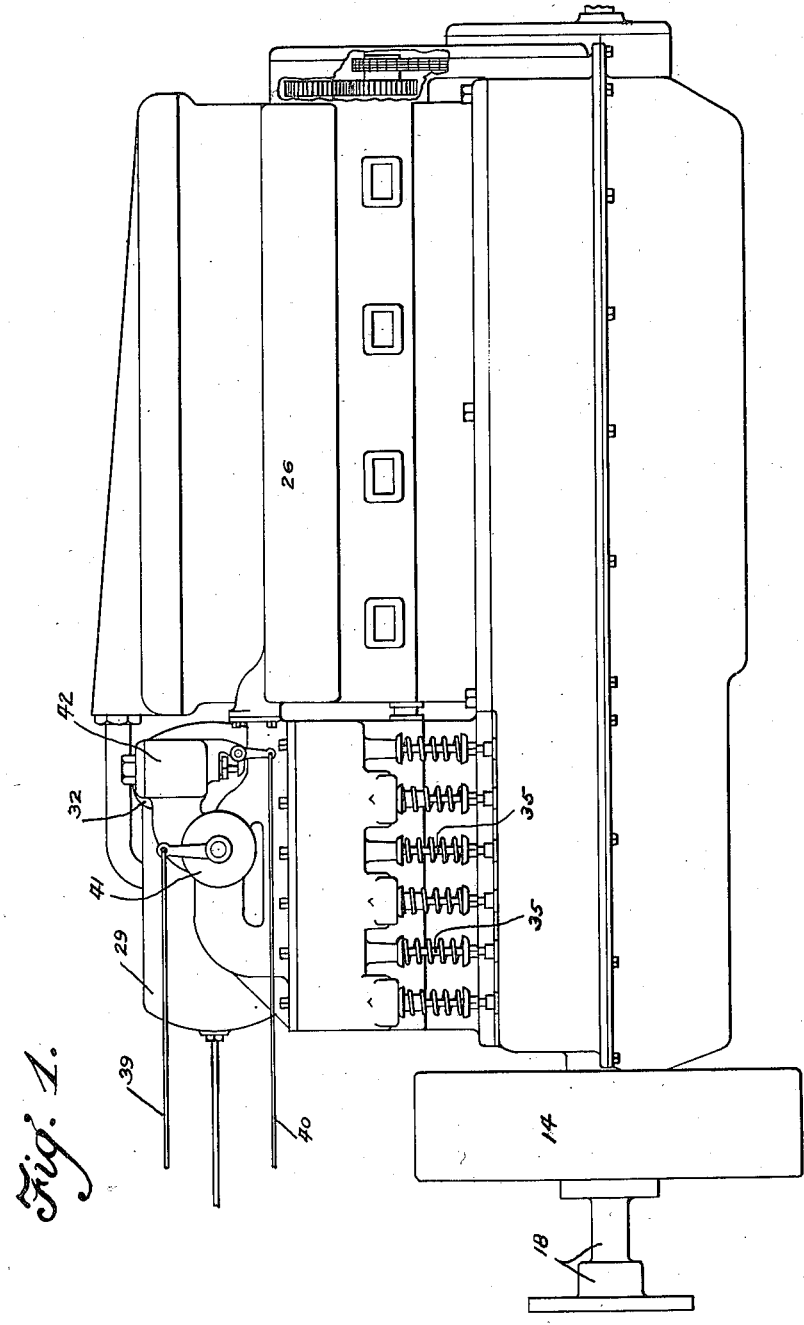
Fig. 1 is a side elevation of one embodiment.
Figure 2:
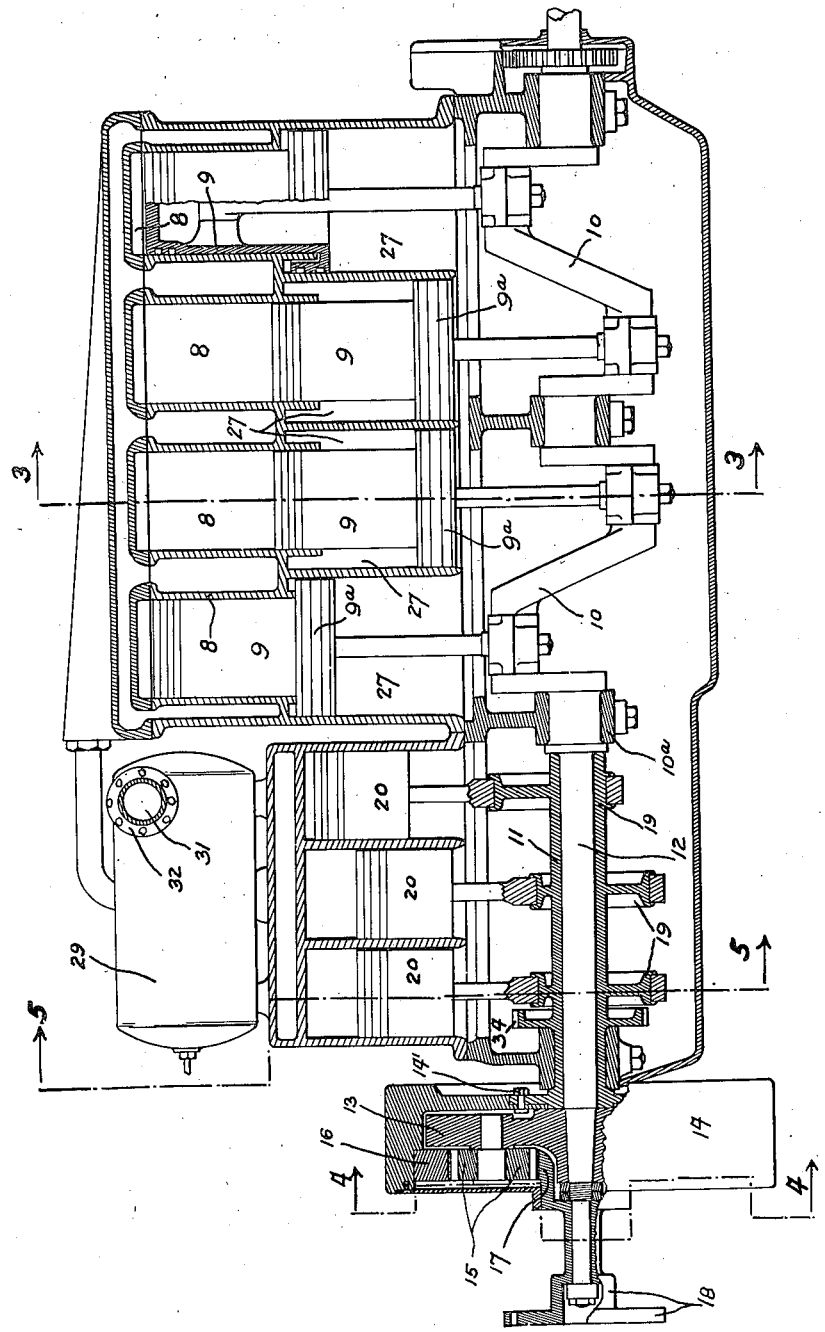
Fig. 2 is a vertical longitudinal section thereof, taken through the crank-shaft center line.

In said Figs. 1 to 7, inclusive, the usual gas cylinders are indicated at 8, the usual gas pistons at 9, and the crank-shaft at 10. Crank-shaft 10, as shown best in Fig. 2, is prolonged to the left beyond a bearing 10$^a$ as a straight shaft 12. Shaft 12 is loose in a sleeve 11. The engine shaft, that is the straight shaft 12, has fixedly mounted thereon a rotary part 13, which rotary part constitutes one of the four characteristic parts of a planetary gear-set here mounted within the engine fly-wheel 14. Pivotally mounted on this rotary member 13 are three planetary gears 15 (compare Fig. 4); which planetary gears constitute the second characteristic element of the planetary gear-set. Sleeve 11 which loosely surrounds straight shaft 12 has fixedly mounted thereon an internal gear 16, which gear 16 constitutes the third characteristic element of the differential; this gear 16 being fixed inside fly-wheel 14, which is hollow and bolted to sleeve 11 as indicated at 14'. To the left of the intermediate conical part of the shaft 12, on which conical part of said shaft the precession member 13 is fixed, shaft 12 is prolonged to provide a reduced cylindrical portion at its extreme left end; and loosely mounted on this last mentioned part of shaft 12 is a flanged sleeve part 18 for connection to the automobile's propeller shaft; part 18 carrying integrally a sun-gear 17 constituting the fourth and last characteristic element of the differential.

Sleeve 11 has fixed thereon three eccentrics 19 for actuating pistons 20 of the air pump.

This air pump compresses air whenever the sleeve 11 turns. The air to be compressed enters through the ports 21 (compare Figs. 4, 6 and 7) and is forced up through passages 22 (see also Fig. 5), one of such passages 22 being provided for each of the pistons of the air pump. The compressed air from passages 22 enters a common passage 23, whence the compressed air passes beyond a control valve 24 and through a passage 25 to an air intake manifold 26 communicating with air motor cylinders 27 by way of a rotary timing valve 28 serving all of the air motor cylinders in properly timed sequence. The passages 23 and 25 on the control valve 24 are most clearly shown in Fig. 6 and the manifold 26 and rotary valve 28 are most clearly shown in Fig. 3. The air motor cylinders, as shown most clearly in Figs. 2 and 3, are arranged below the gas cylinders 8; these air motor cylinders being substantially annular in form due to the presence of the gas pistons 9 and the enlargements 9$^a$ at the bottoms of the pistons 9.

Figure 6:
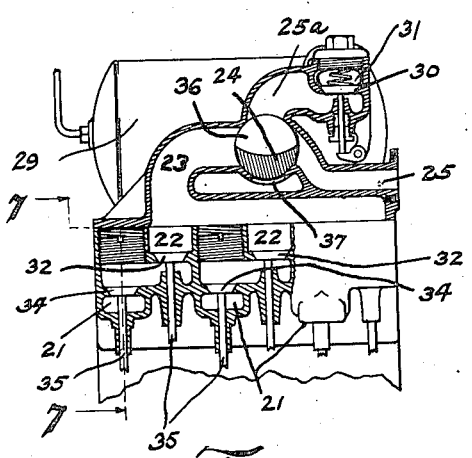
Fig. 6 is a sectional detail view, taken on the line 6—6 of Fig. 4.
Figure 7:
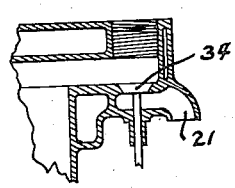
Fig. 7 is a view similar to Fig. 6, taken on the line 7—7 of Fig. 6.

Adverting to Fig. 6, it will be seen that under some conditions only a part of the compressed air in the passage 23 passes the control valve 24 to enter the passage 25 to go to the air motor cylinders as just described; since some of this air also enters a passage 25$^a$ leading to an engine-starting valve 30. Compressed air from the air pump thus enters passage 25$^a$ until an air storage tank 29 is full; it of course being clear that when such tank is full to a predetermined extent the back pressure will be such as to cause all the compressed air in passage 23 to pass beyond control valve 24 into passage 25 for feed into the air motor cylinders. Comparing Figs. 1, 2, 4 and 6, it will be seen that such air as is admitted as just described to tank 29 passes beyond valves 30 through a passage 31 in a casting 32.

Figure 3:
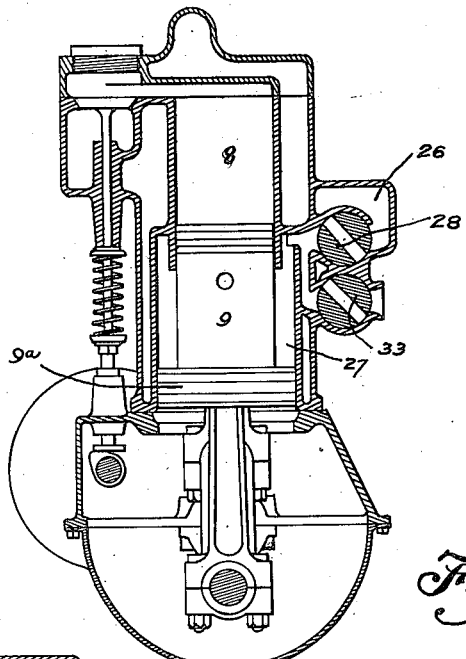
Fig. 3 is a transverse vertical section, taken on the line 3—3 of Fig. 2.
Figure 5:
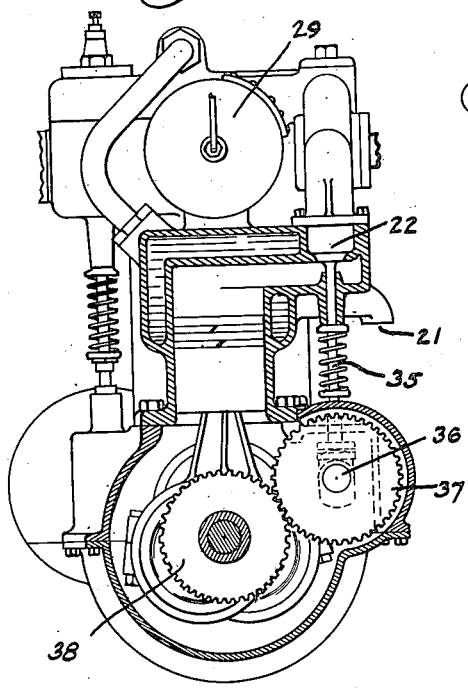
Fig. 5 is a transverse vertical section, taken on the line 5—5 of Fig. 2.
Figure 4:
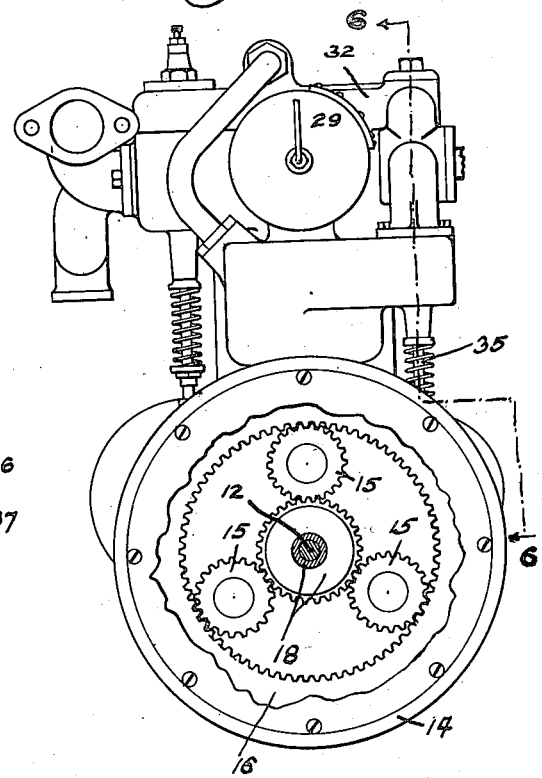
Fig. 4 is a transverse vertical section taken on the line 4—4 of Fig. 2.

The exhaust from the air motor cylinders 27 is controlled by a rotary timing valve 33, similar to valve 28, as shown in Fig. 3. Both the valves 28 and 33 are driven from the crank-shaft to the gas engine, as are the usual gas engine valves. The pump valves 34 have valve stems 35 which are actuated by a proper cam shaft 36, as shown in Fig. 5, carrying a gear 37 driven by a gear 38 on eccentric-sleeve 11.

The operation of the parts above described is as follows:

Assume the tank 29 is full of air under pressure—the engine having been running. First, the control valve 24 (Fig. 6) is turned by operating a rod 39, so that air from the tank may pass into the passage 25 and thence into the air motor cylinders, supporting the engine; whereupon the check valve 30 is tripped by operating a rod 40. These operating rods 39 and 40 are shown in Fig. 1, the valves 24 and 30 being arranged, respectively, in housings 41 and 42. Then, as soon as the engine starts, the control valve 24 is returned to the position shown in Fig. 6, which is a position wherein no resistance is offered to the passage of air from the air pump cylinders to the air motor cylinders, that is, the precession member 13 of Fig. 2 is rotating at maximum speed, and the car is not moving (the transmission is "neutral," that is, the rotation of internal gear 16 by the engine crank-shaft is utilizing its entire power to "walk" planetary gears 15 idly relative to sun gear 17). Next, the control valve 24 as seen in Fig. 6 is rotated counter-clockwise, restricting the air passage 25, and offering resistance to the action of the air pump cylinders. As a consequence, the precession member 13 of Fig. 2 reduces its speed, and the car is driven at "low"; and as this valve 24 is further turned toward the position of greatest constriction relative to passage 25, the ratio proceeds toward "high," when the air pump is running at its slowest speed.

If it is desired to run the engine free, without using the air motor cylinders, the valve 24 may be set so that the passage 23 of Fig. 6 leads to an opening 37 communicating with the atmosphere; and if it is desired quickly to fill the tank 29 when it is empty, the valve 24 may be set to close entirely the passage 25, so that all air from the pump cylinders passes to the tank.

It will be seen, first, that the air pump cylinders are employed in connection with the differential to incorporate here within the engine itself an infinitesimally variable speed controlled transmission relative to the propeller shaft connection 18; and, second, that due to the conserving and looping back of the power generated or developed or delivered at the air pump during the functioning of the latter for speed control, the new engine may be run at constantly decreasing speeds with an increased torque at each decrease of speed at the propeller shaft connection 18, and with high efficiency at all speeds.

Figure 8:
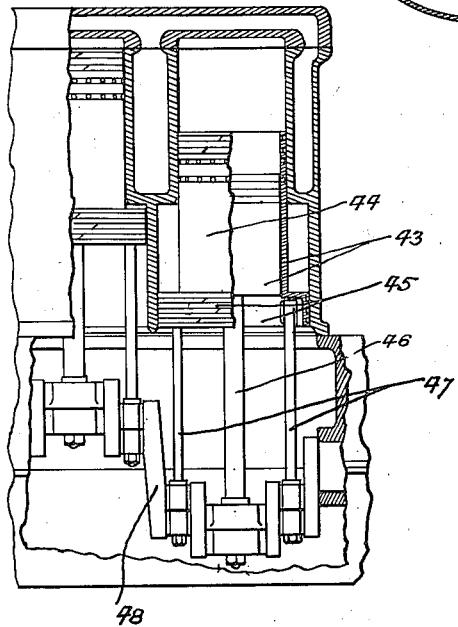
Fig. 8 is a fragmentary view, somewhat similar to Fig. 2 in the nature of its delineation, but showing another embodiment.
Figure 9:
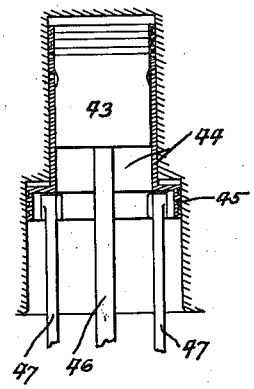
Fig. 9 is a partially diagrammatic view, showing the solid and sleeve pistons of Fig. 8, both at the upper limits of their respective strokes.

Referring to Figs. 8 and 9, there is shown what is believed to be a very desirable arrangement of the gas pistons and the air motor pistons in a construction such as that shown in Figs. 1 to 7 inclusive, where such air motor pistons are built into what may be termed the engine proper. Here 43 indicates a gas piston and 44 indicates a sleeve having an air motor piston 45 integral therewith. Within this sleeve 44, the gas piston 43 slides; and the sleeve 44 itself slides against the cylinder wall, as does also the air motor piston 45. Each gas piston carries a single central piston rod 46 and each sleeve and air motor piston carries a pair of piston rods 47. In order properly to time the sliding movements of the pistons and sleeves, the engine crank-shaft 48 is of the composite type and is provided with main cranks for the rods 46 and minor cranks for the rods 47 suitably designed for comparative throw and appropriate positions in the composite cycle. One advantage of this mode of construction is the use of oiling by the usual splash system. Another point is that all the wear of the sliding parts within the cylinders can be made to occur on the sleeves 43, which are easily replaced, thus saving reboring. Each gas piston has a long stroke, and its associated air motor piston has a shorter stroke, which arrangement is believed to be desirable to get the best results from the compressed air charges acting on the air motor pistons; and in such situation, another advantage is the fact that the stroke of any one sliding part on any other sliding part in the engine cylinder is short and therefore wear is minimized.

I claim:

1. In an internal-combustion engine including a differential gear set having one of the four characteristic elements of said gear set operatively connected to the engine shaft and having another of said elements adapted to be connected to a workshaft, the combination of an air-compressing means of the piston and cylinder type operatively connected to and adapted to be driven by another of said elements; and means, including an air-motor, for confining the air thereby compressed and applying the same to the engine shaft at a point ahead of the differential to impose a torque thereto additional to the torque at that instant being delivered to said shaft from the explosion cylinders of the engine; said compressing means including a tubular shaft and operative connections between said shaft and a piston of the air compressing means, and said tubular shaft loosely sleeving a length of a crank shaft of the engine.

2. The engine defined in claim 1, wherein said operative connection includes an eccentric fixed on the tubular shaft and operatively connected to the piston of the air-compressing means.

3. The engine defined in claim 1, wherein said operative connection includes an eccentric fixed on the tubular shaft and operatively connected to the piston of the air-compressing means, and wherein the first mentioned one of the four characteristic elements of said gear set is operatively mounted for rotation at a speed ratio fixed relative to the crank shaft of the engine and the second mentioned one of said elements is operatively mounted for rotation at a fixed speed ratio relative to the tubular shaft.

4. The engine defined in claim 1, wherein a cylinder of the air motor and a cylinder of the engine are arranged one above the other, with the lower cylinder of greater diameter than the upper cylinder, and wherein the piston working in the lower cylinder is tubular from top to bottom and is of different external diameters at its top and bottom so that its upper external portion is in sliding contact with the upper cylinder while its lower external portion is in sliding contact with the lower cylinder during operation of the engine, and wherein the piston for the upper cylinder is in sliding contact with the internal wall of the upper cylinder's piston during operation of the engine, and wherein operative connections are provided between the two pistons just described and the crank shaft of the engine to give said pistons simultaneously strokes of different lengths.

5. The engine defined in claim 1, wherein a cylinder of the air motor and a cylinder of the engine are arranged one above the other, with the lower cylinder of greater diameter than the upper cylinder, and wherein the piston working in the lower cylinder is tubular from top to bottom and is of different external diameters at its top and bottom so that its upper external portion is in sliding contact with the upper cylinder while its lower external portion is in sliding contact with the lower cylinder during operation of the engine, and wherein the piston for the upper cylinder is in sliding contact with the internal wall of the upper cylinder's piston during operation of the engine, and wherein operative connections are provided between the two pistons just described and the crank shaft of the engine to give said pistons simultaneously strokes of different lengths, and wherein said operative connections are so designed and arranged as to give the piston for the lower cylinder the shorter stroke.

6. The engine defined in claim 1, wherein a cylinder of the air motor and a cylinder of the engine are arranged one above the other, with the lower cylinder of greater diameter than the upper cylinder, and wherein the piston working in the lower cylinder is tubular from top to bottom and is of different external diameters at its top and bottom so that its upper external portion is in sliding contact with the upper cylinder while its lower external portion is in sliding contact with the lower cylinder during operation of the engine, and wherein the piston for the upper cylinder is in sliding contact with the internal wall of the upper cylinder's piston during operation of the engine, and wherein operative connections are provided between the two pistons just described and the crank shaft of the engine to give said pistons simultaneously strokes of different lengths, and wherein said operative connections are so designed and arranged as to give the piston for the lower cylinder the shorter stroke, and wherein the piston for the upper cylinder is an explosion piston of the engine.

7. In a combined internal-combustion and fluid motor having a single crank shaft, the combination of explosion pistons connected to said crank shaft, fluid operated pistons adjacent to said explosion pistons, fluid compressing pistons, a differential gear set having one element connected to said crank shaft, and a rotatable sleeve loose on said crank shaft and connected to another element of said differential, said sleeve having eccentrics fixed thereon operatively connected to said fluid compressing pistons.

8. The motor defined in claim 7, wherein said differential gear set includes a fly-wheel for the motor.

9. The motor defined in claim 7, wherein there is provided a fluid reservoir cooperating with said fluid compressing pistons and said fluid operated pistons.

10. The motor defined in claim 7, wherein a fluid reservoir and a valve means are provided for controlling the flow of liquid between said fluid compressing pistons and said fluid operated pistons.

Signed at New York in the county of New York and State of New York this 30th day of October A. D. 1919.

CHARLES HORTON.